Nov. 21, 1967    E. D. PIERSON ETAL    3,353,324
METHOD AND APPARATUS FOR SEPARATING FOLDED WRAPPERS
AND PLACING SAME UNDER GOODS TO BE PACKAGED
Filed Oct. 26, 1964    6 Sheets-Sheet 1

INVENTORS
EDWARD D. PIERSON
JAMES C. WRIGHT
BY

ATTORNEYS

Nov. 21, 1967     E. D. PIERSON ETAL     3,353,324
METHOD AND APPARATUS FOR SEPARATING FOLDED WRAPPERS
AND PLACING SAME UNDER GOODS TO BE PACKAGED
Filed Oct. 26, 1964     6 Sheets-Sheet 2

INVENTORS
EDWARD D. PIERSON
JAMES C. WRIGHT
BY

ATTORNEYS

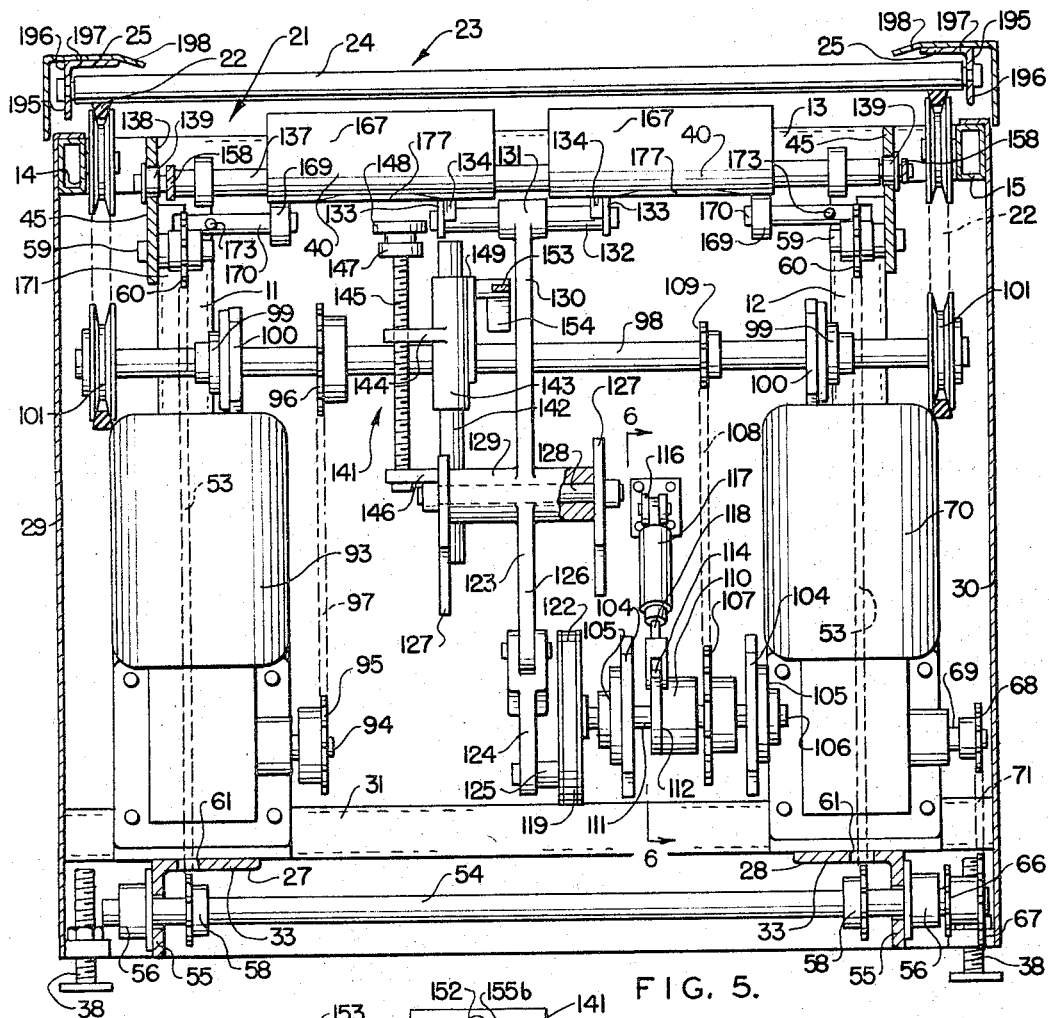

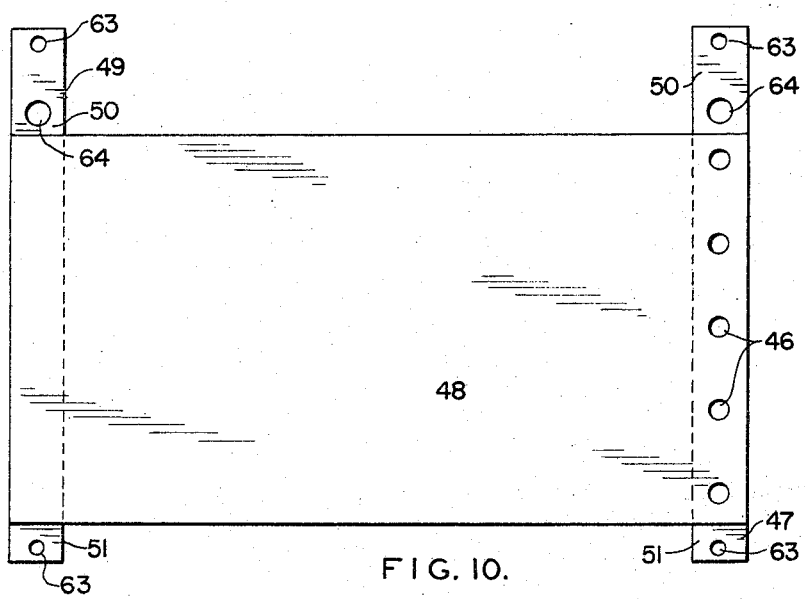
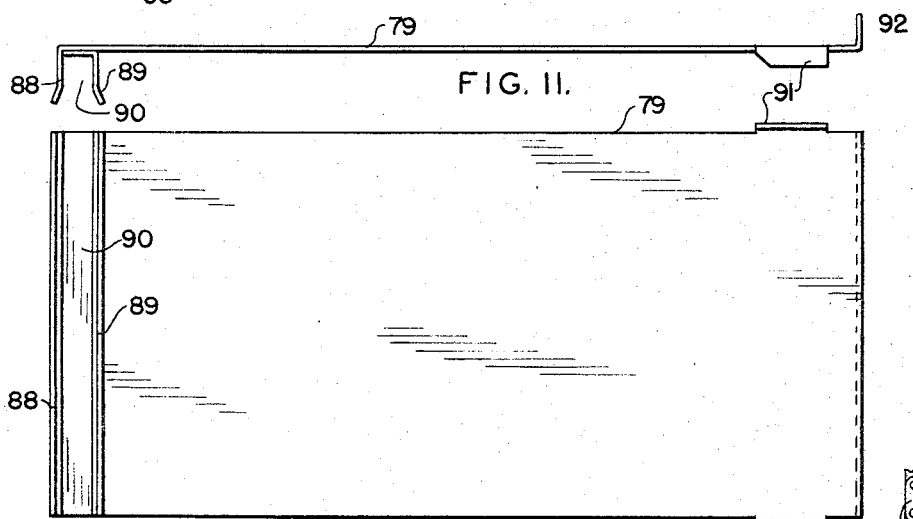
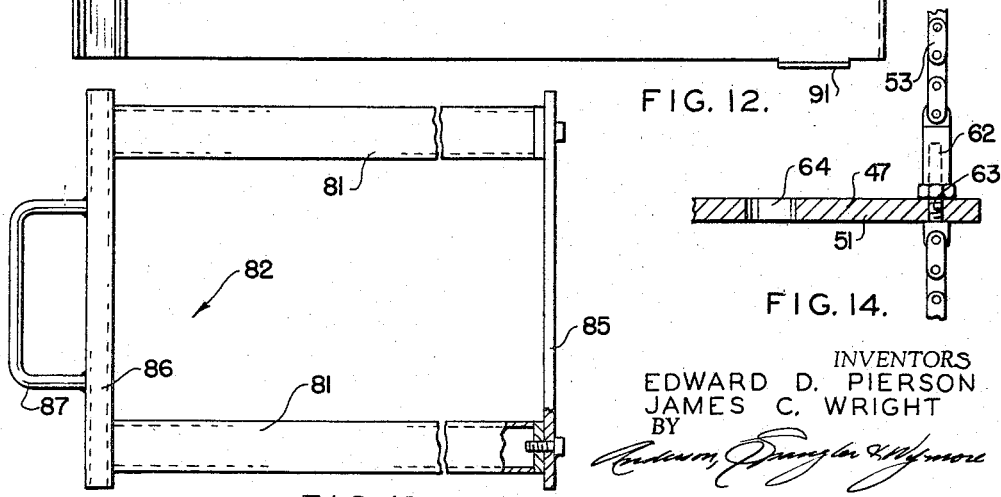

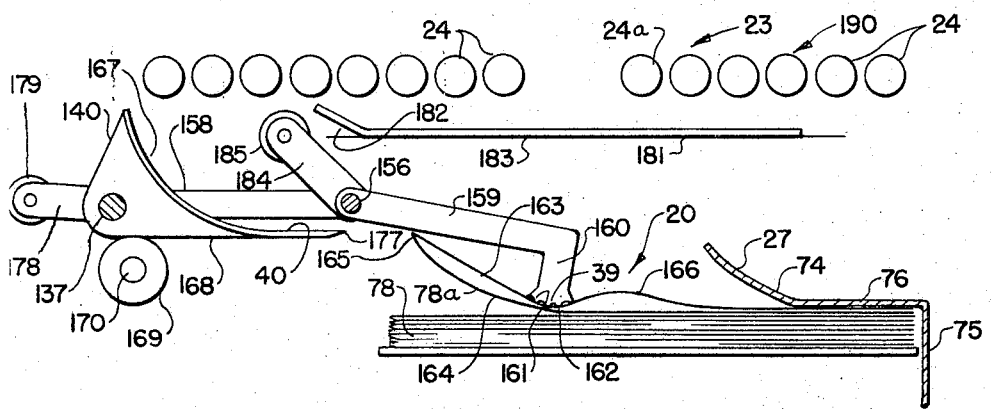
FIG. 15.
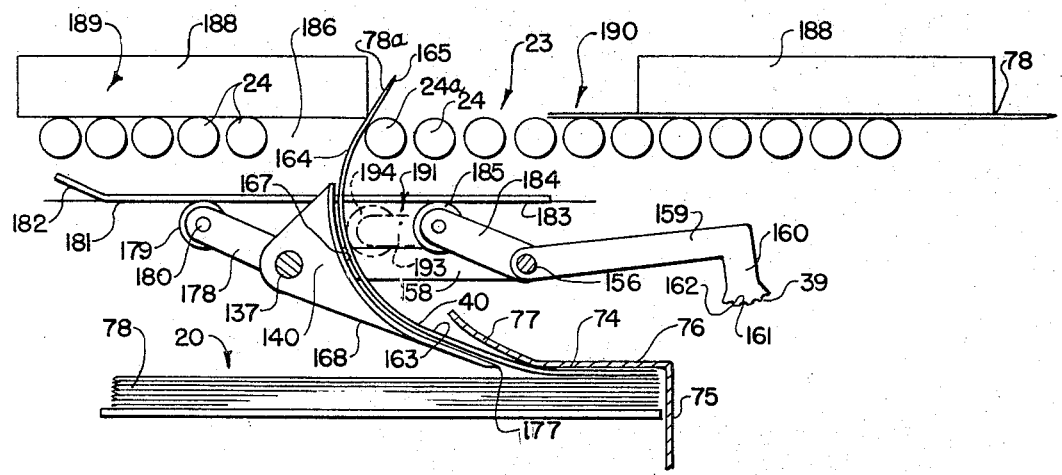
FIG. 16.
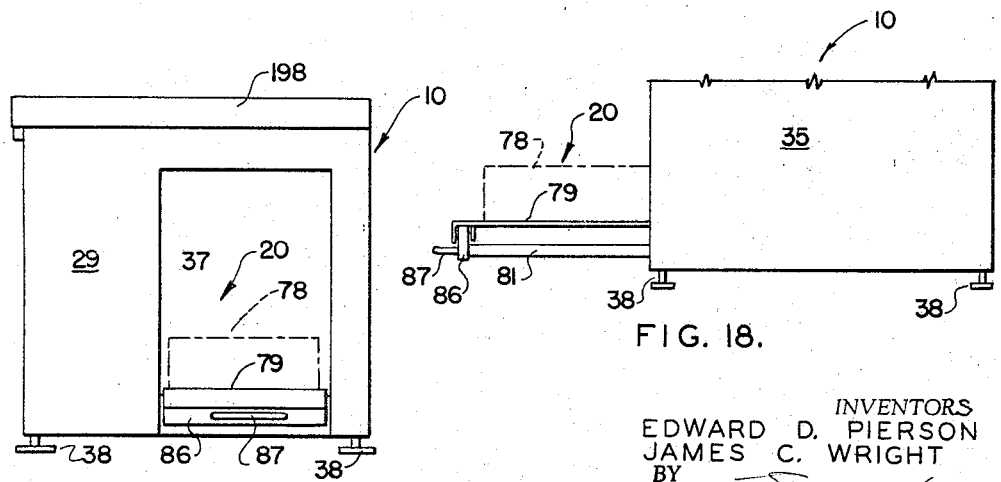
FIG. 17.
FIG. 18.
INVENTORS
EDWARD D. PIERSON
JAMES C. WRIGHT
BY
ATTORNEYS Nov. 21, 1967    E. D. PIERSON ETAL    3,353,324
METHOD AND APPARATUS FOR SEPARATING FOLDED WRAPPERS
AND PLACING SAME UNDER GOODS TO BE PACKAGED
Filed Oct. 26, 1964    6 Sheets-Sheet 6

*INVENTOR*
EDWARD D. PIERSON
JAMES C. WRIGHT
BY
ATTORNEYS

United States Patent Office 3,353,324
Patented Nov. 21, 1967

3,353,324
METHOD AND APPARATUS FOR SEPARATING FOLDED WRAPPERS AND PLACING SAME UNDER GOODS TO BE PACKAGED
Edward D. Pierson and James C. Wright, Denver, Colo., assignors to Miner Machine Company, Denver, Colo., a corporation of Colorado
Filed Oct. 26, 1964, Ser. No. 406,472
17 Claims. (Cl. 53—3)

ABSTRACT OF THE DISCLOSURE

This invention relates to a dispensing mechanism for folded wrappers that uses a friction member to slide the top layer across the second layer for the purpose of raising the folded edge up to admit the leading edge of a scoop-like shoe that moves thereagainst and curls the wrapper up between the rollers of a superimposed roller conveyor into position where goods moving thereacross will pick it up. The wrapper stack is supported atop an elevator that is automatically raised whenever the uppermost wrapper in the stack falls below a pre-determined level as indicated by a sensing mechanism that controls operation of the elevator drive.

---

A great number of articles are placed in stacks and bundled for shipment. Noteworthy among these are such things as magazines and newspapers, cardboard cartons and similar items which cannot be economically packaged in boxes or other containers, yet, are fragile and must be protected by some sort of outer covering.

More or less standard procedure in bundling articles of the type mentioned above is to feed loosely-layered stacks thereof to an automatic wire-tie bundling machine which fastens one or more wires to the stack. These wires, however, cut into the edges of the stack when pulled taut and damage the merchandise unless some sort of wrapper is placed around the stack before the tie is made. In the case of newspapers, magazines and other paper products, it is usually sufficient to protect the edges of the stack with one or more layers of a paper wrapper, the latter oftentimes comprising the same stock being packaged such as, for example, sheets of out-of-date newsprint or old magazine covers. In any event, wrappers of some type are a necessity and the problem becomes one of placing the wrapper on both the top and bottom of the stack and holding the top one in place while the tie is being made.

At the present time, the wrappers are placed on the top and bottom of the stack by hand; however, the bundle-tyer is completely automated and it would constitute a susbtantial saving in time and money if even one of these two wrappers could be positioned and held automatically. Of the two, the most difficult to position is the one under the stack because the operator must lift each stack before a wrapper can be placed therebeneath. It is the latter problem that the device of the present invention is designed to solve realizing that the wrapper on top of the stack will still have to be positioned and held in place by hand.

When the wrapper is placed underneath the stack, the stack holds the wrapper in place while the tie is being affixed. The difficulty here, of course, is getting the wrapper under the stack.

It has now been found in accordance with the teaching of the instant invention that a folded wrapper can easily be placed underneath a stack of loosely-layered articles by feeding the wrapper up between the rollers of a roller conveyor into position to be picked up by the stack passing thereover. The leading edge of the stack merely rides up on the flap of the wrapper that projects above the roller conveyor surface and proceeds to pull the rest of the wrapper through the slot between the rollers until the entire wrapper underlies the stack.

The next problem that required solution was how to pick up the wrappers one at a time. It was discovered that by folding the wrapper in half or quarters and placing one of its folded edges adjacent the pick-up shoes, a finger engaging the wrapper close to the chosen folded edge and pushing away therefrom would wrinkle the top layer as it slid over the bottom layer thereby lifting said edge and enabling the pick-up shoes to move therebeneath.

Next, the "scoop-like" concave blades of the pick-up shoes could move under the elevated folded edge of the wrapper and curl same upwardly and forwardly until said folded edge is passed up between a pair of the conveyor rollers in position to be picked up by an incoming stack.

Accordingly, it is the principal object of the present invention to provide a novel and improved method and apparatus separating a folded wrapper from a stack thereof and then placing said wrapper underneath goods to be packaged.

A second object is the provision of an underwrapper that includes a unique mechanism for picking up the wrappers one at a time from a magazine containing a stack thereof.

Another objective of the invention herein disclosed and claimed is to use the goods to be packaged as the means for pulling the wrapper off the stack and also to hold the wrapper down while the tie is being applied to the bundle.

Still another object is to provide a bottom wrapper that is fully automatic.

An additional objective is the provision of a wrapper feeding device that incorporates a unique pick-up mechanism that functions to curl the wrapper up into position underneath the stack where the latter finishes retracting same.

Further objects of the invention are to provide a mechanism for placing a wrapper beneath a stack of layered articles that is simple to operate, trouble-free, rugged, fast, dependable, versatile, relatively inexpensive and efficient.

Other objects will be in part apparent and in part pointed out specifically hereinafter in connection with the description of the drawings that follows, and in which:

FIGURE 5 is a vertical section taken along line 5—5 of FIGURE 4;

FIGURE 6 is a fragmentary section taken along line 6—6 of FIGURE 5 showing the single-revolution clutch mechanism that reciprocates the pick-up shoes;

FIGURE 7 is a fragmentary detail of the single-revolution clutch brake;

FIGURE 8 is a fragmentary detail of the stack-height control mechanism;

FIGURE 9 is a fragmentary detail showing the slotted rail within which the pick-up and wrinkle finger mechanisms reciprocate;

FIGURE 10 is a top plan view of the elevator platform;

FIGURE 11 is a side elevation of the removable wrapper tray;

FIGURE 12 is a bottom plan view of said tray;

FIGURE 13 is a top plan view of the tray carrier, portions of which have been broken away to conserve space and other portions shown in section;

FIGURE 14 is a fragmentary section showing the manner in which the chain hoist is attached to the elevator platform;

FIGURE 15 is a schematic view showing the wrinkle-finger wrinkling a wrapper;

FIGURE 16 is a schematic view similar to FIGURE 15 showing the pick-up shoes placing the lifted wrapper underneath a package;

FIGURE 17 is a front elevation of the base and magazine to a reduced scale;

FIGURE 18 is a fragmentary side elevation of the base showing the wrapper tray and carrier therefor pulled out.

Figure 1:
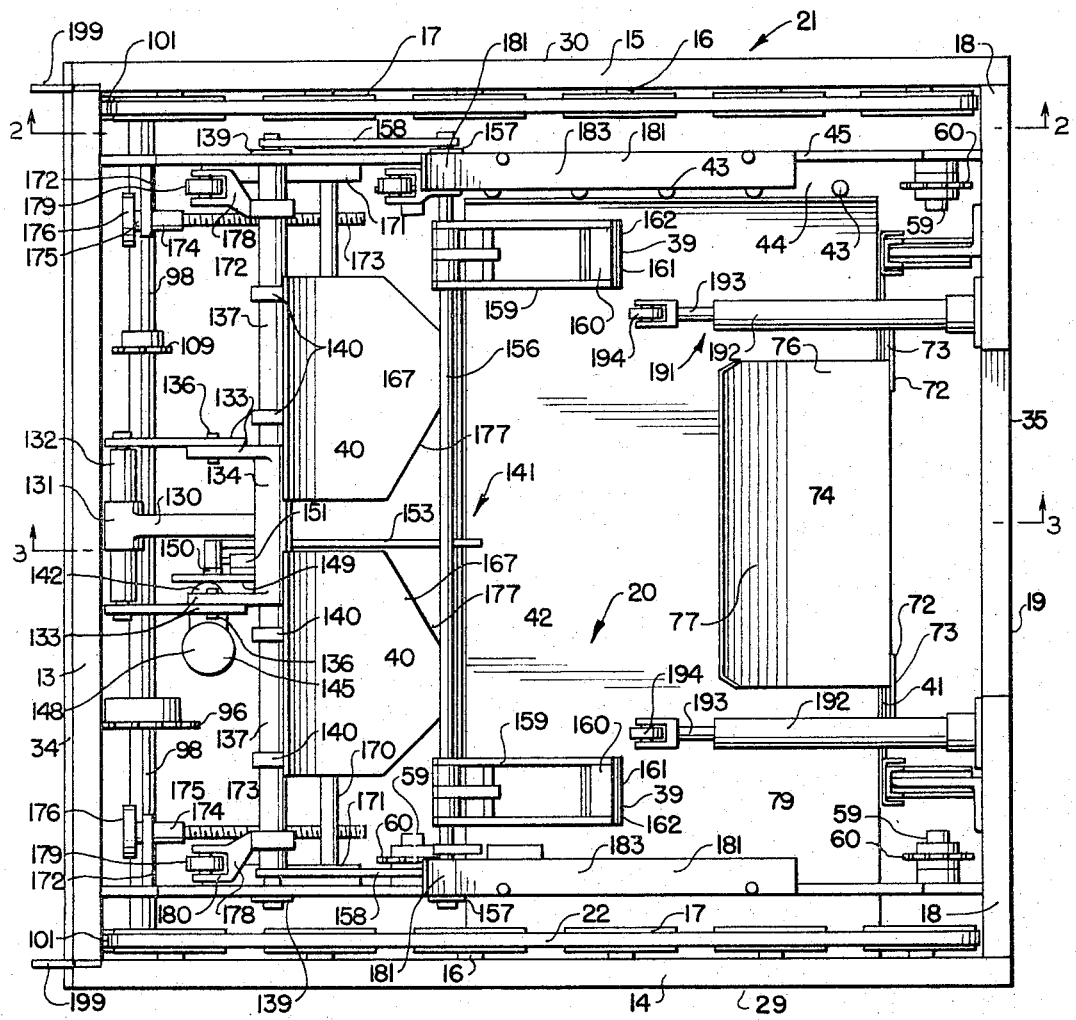
FIGURE 1 is a top plan view of the bottom wrapper with the roller conveyor assembly removed to expose the interior thereof.

Referring now to the drawings for a detailed description of the present invention and, initially, to FIGURES 1–5, 17 and 18 for this purpose, it will be seen that the unit is housed within a generally box-like base that has been broadly designated by reference numeral 10. The left or intake end of the base has front and rear vertically-extending hollow rectangular uprights 11 and 12 spaced inwardly from the corners of the base and overlaid by an upper horizontal frame member 13 that extends all the way to the corners where it is joined to front and rear upper horizontal frame members 14 and 15. The latter frame elements carry a plurality of longitudinally-spaced parallel shafts 16 upon which V-belt pulleys 17 are journalled. The right end of the frame has an upper horizontal frame member 18 spanning the distance between frame elements 14 and 15 but differing slightly from element 13 in that it has a downwardly offset portion 19 which defines an access opening into the wrapper magazine that has been broadly designated by reference numeral 20. Elements 13, 14, 15, 18 and 19 also cooperate with one another to produce an upper subframe broadly designated by reference numeral 21 that cooperates with the pulleys 17 and the V-belts 22 reeved thereon to provide a support for the roller conveyor subassembly generally referred to by reference numeral 23 and which includes a plurality of rollers 24 journalled within hinged frame sections 25 and 26.

In the bottom of the base are a pair of heavy angle-iron supports 27 and 28 that extend longitudinally between the ends in spaced parallel relation to one another and inset from the front and rear wall panels 29 and 30. Lower horizontal frame elements 31 and 32 are laid across the horizontal flanges 33 of the angle irons cooperating with other of the end elements to anchor endplates 34 and 35 to the base. Additional uprights 36 are provided on the right end of the base to reinforce same as needed.

Figure 4:
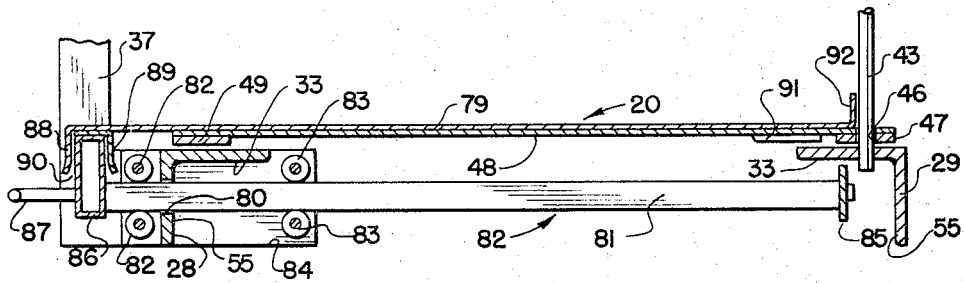
FIGURE 4 is a fragmentary transverse section taken along line 4—4 of FIGURE 3 revealing the details of the wrapper magazine.

Front panel 29 has a large rectangular opening 37 therein bordered by suitable frame members, one of which has been shown in FIGURE 4 and identified by reference numeral 37. This opening provides access to the wrapper magazine 20 and houses the sliding wrapper tray assembly that will be explained presently.

Adjustable feet 38 are provided at the corners of the base for purposes of leveling same. The base is also provided with various other brackets, reinforcing members and the like as are required to support the several operative components, many of these will be specifically identified as the description proceeds.

Much of the interior of the base is taken up by the wrapper magazine 20 which holds a supply of the wrappers and constantly places them in position to be picked up by the wrinkling fingers 39 and shoes 40. Accordingly, the magazine will be described next with specific reference to FIGURES 1, 3, 4 and 10–18, inclusive, all of which reveal certain details thereof.

Resting atop the horizontal flanges 33 of the angle-iron supports 28 and 29 are the inturned bottom edges of right and left vertical divider panels 41 and 42 which extend from front to rear in spaced substantially parallel relation to one another defining a wrapper compartment in the right side of the base. The front of the compartment thus formed is open while the rear thereof is closed by a series of vertical rods 43 suspended from a suitable bracket 44 fastened to the lower edge of rail 45 that extends between the endwalls in spaced relation in front of the rearwall. The lower ends of these rods pass through apertures 46 of bar 47 that runs along the rear edge of elevator platform 48. This platform is essentially horizontal and moves up and down between compartment walls 41 and 42 with rods 43 serving as guides therefor.

Bar 47 along with a similar bar 49 fastened along the front edge of platform 48 project slightly beyond both the right and left edges thereof to provide pairs of ears 50 and 51 to which the chains 52 and 53 of the elevating mechanism are attached. Chains 53 are located on the left side of the magazine at the front and rear corners thereof while chains 52 are similarly located on the right side as clearly seen in FIGURE 3.

Figure 3:
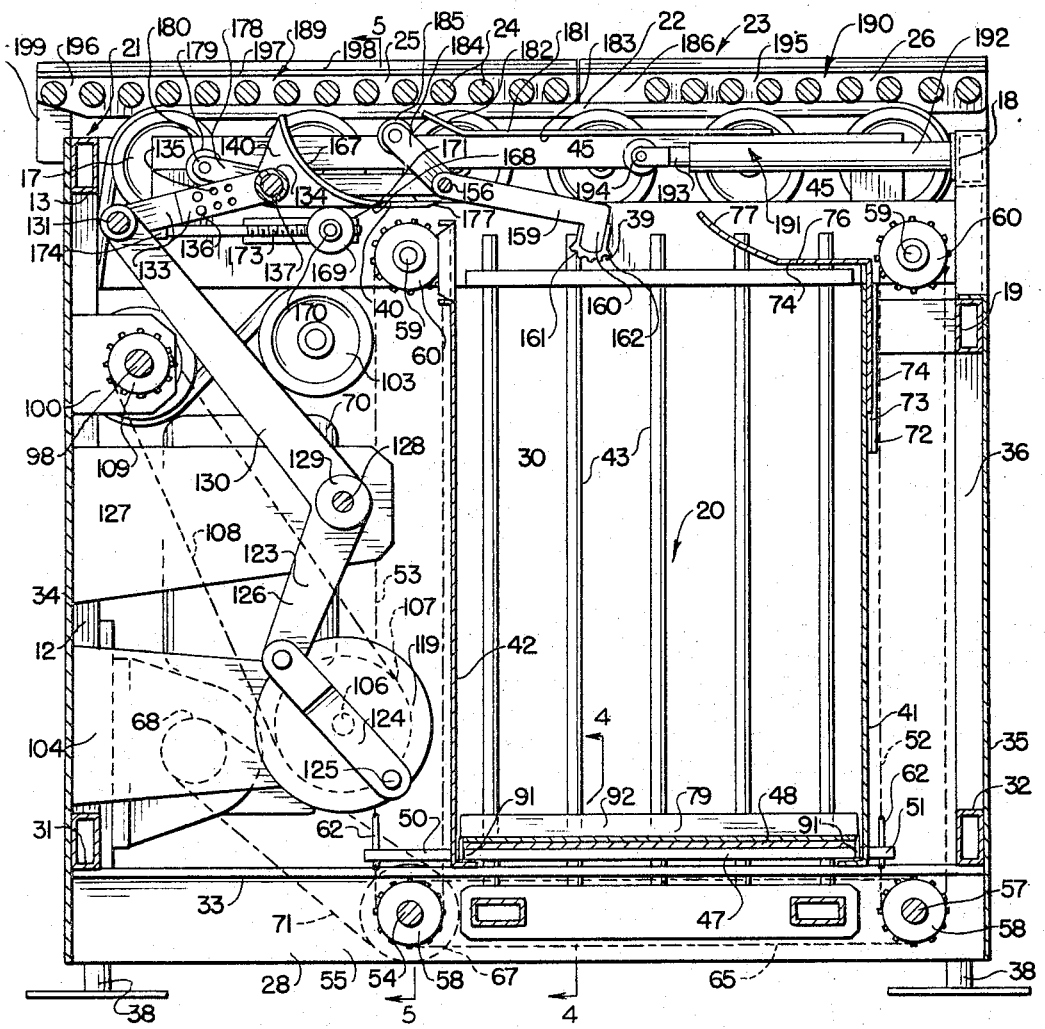
FIGURE 3 is a vertical section taken along line 3—3 of FIGURE 1.

A shaft 54 passes through openings provided therefor in the vertical flanges 55 of angle-iron supports 27 and 28 at which point said shaft is journalled for rotation in bearings 56 attached to the vertical flange. This shaft is located directly underneath ears 50 that project from the left side of the elevator platform 48. A second shaft 57 is journalled for rotation underneath ears 51 on the right side of the elevator platform as shown in FIGURE 3. Both of these shafts carry sprocket gears 58 thereon positioned underneath the adjacent horizontal flanges 27 of the angle irons. Rails 45 that run from end-to-end of the base in the top thereof above the angle irons carry stub shafts 59 upon which are journalled sprockets 60 in vertical alignment with the lower sprockets 58. The sprocket chains 52 and 53 are reeved between the vertically-aligned sprocket pairs and openings 61 (FIGURE 5) are provided in the flanges 33 to pass the chains. Each of the four chains is provided with an attaching link 62 that fastens the chains into opening 63 in the projecting ears 50 and 51 of bars 47 and 49. In the particular form shown, ears 50 also require a second aperture 64 to pass the unfastened run of the chains. Ears 51, on the other hand, are shorter and the unfastened chain run passes outside thereof as shown in FIGURE 3.

Shafts 54 and 57 are operatively interconnected for conjoint rotation in the same direction and at the same speed by chain 65 that passes between sprockets 66 fastened to said shafts behind the vertical flange 55 of the rear angle-iron 33, only one of said sprockets 66 having been shown. A sprocket 67 attached to shaft 54 is connected to sprocket 68 on the shaft 69 of the reversible gear motor 70 by sprocket chain 71 as shown in FIGURE 5. Thus, when the motor 70 is actuated to turn shafts 54 and 57 clockwise as viewed in FIGURE 3, the elevator platform will rise in the wrapper compartment to keep a wrapper in position to be picked up by wrinkle-fingers 39. Right compartment wall 41 has a pair of brackets 72 attached to the outside thereof that define opposed slots 73 with said wall adapted to receive stack-depresser 74. The latter element has a vertical wall portion 75 that slides up and down within slot 73 and an overhanging portion 76 with an upwardly curving end 77 which overlies the wrapper magazine and presses down on the right-hand edge of the wrappers 78 placed therein as shown in FIGURES 15 and 16.

Next, to facilitate loading of the magazine, a removable sliding tray 79 is provided in the bottom thereof resting on elevator platform 48. The vertical flange 55 of the front angle-iron 28 has a pair of longitudinally-spaced openings 80 therein adapted to pass the hollow rectangular rails 81 of a carrier which is broadly designated by reference numeral 82. These rails are supported for rolling movement by front and rear roller pairs 82 and 83 that depend from bracket 84 and engage said rails at transversely-spaced points on both the top and bottom thereof. The rear extremities of these rails are interconnected by a stop-forming member 85 which will engage the rear pair of rollers 83 preventing the carrier from the sides of the tray which slip over the edges of the elevator platform to prevent relative lateral movement therebetween. The rear margin 92 of the tray is upturned along rods 43 as shown.

When the carrier is rolled forwardly out of the magazine tray 79 comes with it as the tray slides along the elevator platform 47. Once the tray is out of the magazine and in the position shown in FIGURE 18, it can be lifted free of the carrier and elevator platform. Loading of the magazine with wrappers is customarily accomplished in this manner.

At this point it would be well to describe the type of wrapper that the unit of the present invention is designed to pick-up. The wrapper must have at least one folded edge that can be positioned adjacent the pick-up shoes. Also, in the case of a wrapper that has been folded more than once such as, for example, a quarter-folded sheet of newsprint, it is the final or quartering-fold that must be used. The reason for this is that least two relatively slidable layers must be present on both sides of the chosen fold in order for the unit to pick-up properly. Take, for example, a wrapper made up of a full sheet of newsprint folded in quarters. When the quartering-fold is located facing the pick-up shoes, the halving fold will be adjacent thereto on one side while the free edges of the sheets will lie on the other adjacent edge as well as opposite the quartering fold. Thus, two overlapping layers will extend away from the quartering fold, the upper one of which can be slid across the lower to elevate the quarter-folded edge. Conversely, if the halving fold were positioned facing the pick-up shoes, the quartering-fold would lie on an adjacent side edge connecting the two layers together that must slide relative to one another thus preventing the unit from working properly.

For practical purposes, no more than a twice or quarter-folded wrapper will usually be used although these are most common. It should also be mentioned that such a wrapper may, and often does, include several individual sheets, therefore, when the term "layer" is used herein it is intended to define multiple as well as single-sheeted layers.

The simplest wrapper than can be used is a single sheet folded approximately in half such as a half sheet of news print folded cross-wise. For purposes of explanation, such a wrapper has been illustrated in the drawings so as to reduce the confusion a multiple-sheeted wrapper would produce.

Now, with the magazine loaded with wrappers and the elevating mechanism energized to bring them up under stack-depresser 74, the problem becomes that of removing the wrapers one-at-a-time. The mechanisms by which this is accomplished have been illustrated in FIGURES 1–3, 5, 15 and 16 to which reference will now be made.

Figure 2:
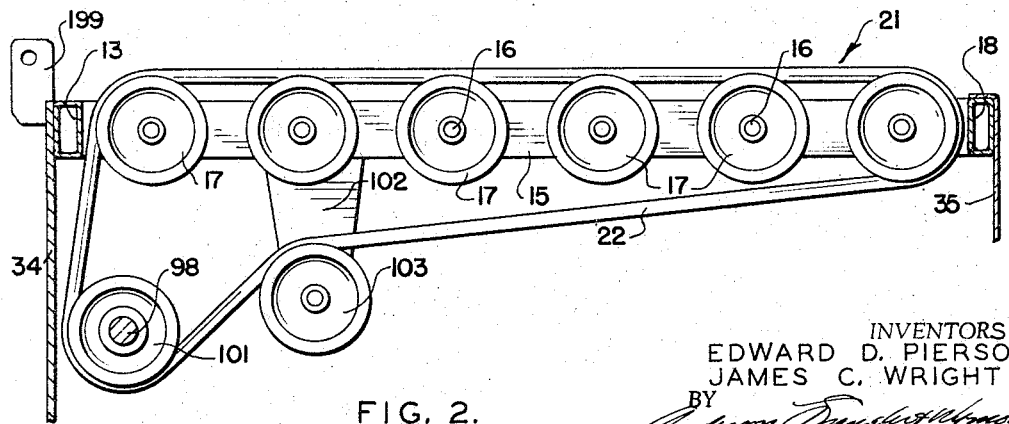
FIGURE 2 is a longitudinal section taken along line 2—2 of FIGURE 1 to show the belt drive for the roller conveyor assembly.

In the particular form shown, the gear motor 70 that drives the magazine elevator is positioned in the rear left-hand corner of the base; whereas, another similar gear motor 93 is located in the front left-hand corner to provide the power for the remaining operative subassemblies of the unit. The motor shaft 94 is connected by sprockets 95 and 96 through chain 97 to main transverse shaft 98 that is journalled in bearings 99 fastened into brackets 100 attached to left endwall 34. Pulleys 101 mounted on opposite ends of this shaft carry the V-belts 22 that are reeved over pulleys 17 and drive the rollers 24 of the roller conveyor subassembly 21. In FIGURE 2 it will be seen that a pulley bracket 102 hangs down from the sideframe element 15 and carries still another V-belt pulley 103 over which the V-belt 22 is reeved to take up the slack in the latter. A similar arrangement, not shown, is provided in the front of the unit.

As seen most clearly in FIGURES 3, 5 and 6, a pair of brackets 104 are attached to the left endwall 34 and project to the right therefrom in spaced relation near the bottom of the base adjacent gear motor 70 thus placing same in the rear half of the unit. These brackets carry bearings 105, one of which journals shaft 106. On this shaft is a sprocket 107 operatively connected to shaft 98 by means of chain 108 and sprocket 109. Shaft 106 provides the continuously-rotating input to friction clutch 110 (FIGURES 5 and 6), the output of which is intermittent shaft 111 that is journalled in the other of the bearings 105. Clutch 110 is of a common type having a pair of interlocking elements (not shown), one of which connects to input shaft 106 while the other carries the output shaft 111. One of these elements is spring-biased into locked engagement with the other but is disengaged therefrom when moved in a direction opposite to that at which it normally rotates.

Briefly referring to FIGURE 6, it will be seen that clutch 110 carries as a part thereof a single-revolution stop cam 112 having a notch 113 in its peripheral edge which upon counter-clockwise rotation will engage pivoted stop pawl 114 stopping shaft 111. The pawl is carried for pivotal movement within clevis 115 attached to left endwall 34. Up above clevis 115 is a second clevis 116 attached to endwall 34 that pivotally mounts stop-retraction solenoid 117, the operator 118 of which is pivotally connected to the pawl intermediate the ends thereof. Actuation of the solenoid in a direction to retract its operator 118 will raise up the pawl 114 out of notch 113 allowing clutch 110 to operatively interconnect shafts 106 and 111 for a single 360° revolution; whereupon, the pawl will again engage notch 113 and stop shaft 111.

The end of shaft 111 also carries a peripherally-grooved disk 119 which can best be seen in FIGURES 3, 5 and 7, to which reference will now be made. This disk actually performs the function of a crank arm to bring about reciprocating motion of the wrinkle fingers 39 and pick-up shoes 40; however, it is made circular to perform the supplementary function of a brake drum. Wall 34 mounts an L-shaped bracket 120 and a pair of hooks 121 to which are connected a brake band 122 having a tension spring 123 therein. The brake band 122 encircles grooved disk 119 and constitutes a friction brake adapted to even out the essentially sinusoidal motion imparted to rocker arm 123 by said disk. This braking system also lessens the impact of the stop pawl 114 engaging notch 113 of cam 110, these elements being ones that develop considerable inertia and have a pronounced tendency to overrun beyond the single-revolution cycle.

Link 124 has one extremity thereof pivotally attached to the periphery of disk 119 by pivot element 125 while the other bifurcated end thereof is pivotally connected to lower leg 126 of dog-leg rocker arm 123. Attached to the inside face of left endwall 34 are a pair of spaced brackets 127 that are located approximately in the center of said wall above and forwardly of brackets 104 as shown in FIGURE 5. A pivot pin 128 extends between these brckets 127 and the bosses 129 at the apex of dog-leg rocker arm 123 are pivotally mounted on said pin. The upper leg 130 of the rocker arm 123 has a similar boss 131 on the upper extremity thereof which receives pin 132 that parallels shaft 98 in spaced relation above the latter. Opposite ends of pin 132 are pivotally attached to the adjustable arms 133 projecting to the left of bushing 134 from which they depend. As shown in FIGURE 3, arms 133 are formed by two overlapping sections, one of which contains a series of apertures 135 that selectively receive fasteners 136 to vary the length thereof.

Bushing 134 rotatably receives rail-mounted shaft 137 which extends transversely between slotted rails 45. These rails have horizontal longitudinally-extending slots 138 therein (FIGURE 9) which receive flanged trunnions 139 journalled for rotation on opposite ends of shaft 137. Fastened to this shaft are the webbed ears 140 of the pick-up shoes 40. Elements 129, 131, 132 and 134 of the rocker arm assembly cooperate with one another to reciprocate rail-mounted shaft 137 while, at the same time, preventing it from becoming skewed relative to the slotted rails 45.

Gear motor 93 along with main shaft 98 rotate continuously as does stub shaft 106 which is the input to the friction clutch 110. Shaft 111, on the other hand, operates intermittently upon release of the retractable stop 114. When braked disk 119 is released and allowed to turn, it will act through link 124 to bring about rockable movement of arm 123 which, in turn, reciprocates shaft 137 from left to right and back again within tracks 45. As shaft 137 reciprocates, it drops the wrinkle-fingers 39 down onto the uppermost wrapper of the stack and they raise the folded edge thereof up enough for the pick-up shoes to slide therebeneath and separate said wrapper from the pile. In order to do so, however, very precise relationships must be maintained at all times between the wrapper stack, wrinkle-fingers and pick-up shoes. Thus, while describing the movements of the shoes and wrinkle-fingers it will be desirable to note the several adjustable controls that are used to maintain the above-described relationships.

Once properly adjusted the wrinkle-fingers and shoes always move in exactly the same path, therefore, the uppermost wrapper of the stack must be in position to be engaged thereby even though the height of the wrapper stack is constantly changing. The position of the uppermost wrapper is kept relatively constant by means of reversible gear motor 70 and the stack height sensing means broadly indicated by numeral 141 which controls same and has been shown in FIGURES 1, 5 and 8 to which reference will now be made.

Projecting upward vertically from the front bracket 127 that carries pivot pin 128 is a post 142. A sleeve 143 is mounted on this post for vertical sliding adjustable movement and a horizontally-disposed ear 144 projects laterally therefrom in position to receive the shank of threaded adjusting screw 145. A platform 146 projects horizontally from bracket 127 in position to receive the lower end of the adjusting screw and another bracket 147 projects from left endwall 34 in position to receive the upper end thereof. Bracket 147 and platform 146 cooperate to support screw 145 for rotational movement while preventing axial movement thereof in a manner well known in the art. A head 148 on the screw rests atop bracket 147 and provides the means for raising and lowering sleeve 143 on rod 142.

Sleeve 143 also carries a plate 149 mounting a pivot pin 150 (FIGURE 5) and a pair of micro-switches 151a and 151b arranged in opposed relation. A sleeve 152 is rotatably mounted on pin 150 above and to the left of the micro-switches. An elongate lever 153 is carried by said sleeve and extends to the right thereof underneath shaft 137 to a position overlying the stack of wrappers 78 in magazine 20. A shorter lever 154 is carried by the sleeve in position to engage the push-buttons 155a and 155b of switches 151a and 151b when lever 153 is moved up and down.

Switch 151a is normally-closed while switch 151b is normally-open and both are electrically connected into the wrapper platform elevating circuit of motor 70. Thus, with the lever 153 dropped down leaving switch 151a closed and actuating 151b into closed position, the gear motor 70 will be energized into elevating mode raising platform 47 and the stack of wrappers 78 laid thereon. As soon as the uppermost wrapper contacts lever 153 and raises it up, switch 151b will re-open but the gear motor will continue to run as will be explained presently until switch 151a opens, whereupon, the motor will shut off leaving the stack in the desired position for the pick-up of the next wrapper. Removal of a few wrappers from the top of the stack will, once again, drop lever 153 down far enough to release switch 151a into closed position thereby again closing 151a and energizing motor 70 to raise the stack a little more. Adjustment of lever 153 up or down is accomplished by means of screw 145 so as to stop the stack in correct position for pick-up shoes 40 and wrinkle-fingers 39.

Next, with reference to FIGURES 1, 3, 15 and 16 it will be seen that a second rail-mounted shaft 156 is positioned to the right of shaft 137 in spaced parallel relation thereto. Shaft 156 has flanged trunnions 157 (FIGURE 1) on opposite ends thereof that run in the slots 138 of tracks 45 in the same manner as those of shaft 137. Shafts 137 and 157 are interconnected on both ends by connecting links 158 best seen in FIGURES 15 and 16. Therefore, shafts 137 and 156 reciprocate together within the slots 138 of rails 45.

Shaft 156 carries a pair of bifurcated arms 159 fixedly attached thereto at transversely-spaced points overlying the wrapper magazine 20. These arms each have downturned ends 160 that carry friction feet 161 that have transversely corrugated arcuate undersurfaces 162 positioned to engage the uppermost wrapper of the stack thereof lying in the magazine. These feet 161 together with the arms 159 carrying same constitute the wrinkle-fingers 39 that raise the wrapper up into position for the pick-up shoes to move underneath. This operation can best be described with specific reference to FIGURES 15 and 16 although brief mention will be made of FIGURES 1 and 3.

At the beginning of the pick-up cycle, shafts 137 and 156 are fully-extended to the right as shown in FIGURE 16. In FIGURE 15, the wrinkle-fingers have retracted and the friction elements 161 thereof have dropped down onto the uppermost wrapper 78a of the stack in the magazine 20 and are in engagement with the upper layer 163 thereof. All of the wrappers 78 are positioned in the magazine folded in half to provide an upper layer 163 and a lower layer 164 with the fold 165 to the left facing the pick-up shoes. The right-hand free edges 166 of the wrappers abut the right wall 41 of the magazine.

Now, as soon as the rocker arm 123 actuates to move shafts 137 and 156 to the right or extended position, the friction feet 161 of the wrinkle fingers will slide the upper layer 163 of uppermost wrapper 78a to the right across the lower layer 164 causing said upper layer to wrinkle at 166 (FIGURE 15) immediately ahead of the advancing fingers. As previously mentioned, each of these layers 163 and 164 can comprise more than one sheet although for purposes of simplicity, single-sheet layers have been illustrated. The lower layer 164, on the other hand, will not wrinkle thus causing the folded edge 165 to raise up as shown in FIGURE 15 above the remaining wrappers in the stack. Meanwhile, the scoop-shaped blades 167 of the pick-up shoes 40 have also been moving to the right into position overlying the wrapper stack.

Shoes 40, if unsupported, would swing down underneath shaft 137 that supports same, therefore, it is necessary to hold them up until they have moved far enough to the right to drop down on the wrapper stack. Web-shaped ears 140 that attach these shoes to shaft 137 have a horizontally-disposed bottom edge 168 that rides along a roller 169 journalled for rotation on transverse stub shaft 170 which is mounted for longitudinal adjustment within channel-shaped track 171 attached to rail 45. Brackets 172 mount on rails 45 and journal adjusting screws 173 for rotational movement between collars 174 and 175 screwed near the head 176 thereof. The threaded shank of the screws 173 is threaded into shafts 170 so as to adjust same either right or left within their brackets 171.

Now, as seen in FIGURE 3, the horizontal bottom edges 168 of the webbed ears 140 ride along the rollers 169 as the shoes 40 move to the right. While so supported, the leading edges 177 of the blades 167 are held in elevated position well above the top of the wrapper stack. The rollers 169 are adjusted longitudinally such that the webs run off said rollers as soon as the blades are far enough to the right to drop down on top of the wrapper stack. Note, however, that the blades drop down onto the wrapper that is second from the top, the top one having already been raised up and moved slightly to the right by the wrinkle-fingers that previously engaged it. As the pickup shoes continue to move to the right, they slide under the uplifted folded edge 165 of the uppermost wrapper in the manner illustrated in FIGURE 16.

When the leading edges of the blades drop down on the wrapper stack they would, on occasion, dig in and tear up a few if allowed to slide to the right along the top thereof. Accordingly, it is advisable to lift the leading edges of the blades back up off the stack shortly after the shoes move into position underneath the top one. This is accomplished by attaching rearwardly-extending arms 178 to shaft 137 and journalling rollers 179 in the bifurcated end portions 180 thereof in position to ride under overhanging track 181 attached to rail 45. These rollers are so located that they raise the leading edges 177 of the blades up off the stack as they ride down inclined end 182 of the track and along the horizontal portion 183 thereof.

This same overhanging track 181 also serves to lift the wrinkle-fingers free of the uppermost wrapper 78a once the pick-up shoes 40 have moved into position therebeneath. Similar rearwardly-extending arms 184 carrying rollers 185 are fixedly attached to shaft 156 and said rollers are positioned to ride along the underside of overhanging track 181 in the same manner as rollers 179.

Before shaft 156 moves into the fully-retracted position of FIGURES 1 and 3, rollers 185 have left the inclined end 182 of the overhanging track permitting the feet 161 to drop down onto the top of the stack preparatory to performing the wrinkling operation. At this point, the shoes are riding along the top of rollers 169. Then, as the mechanism begins to move to the right, the wrinkle-fingers perform the wrinkling operation and remain in contact with the topmost wrapper until the shoes leave rollers 169 and drop down onto the second wrapper of the stack. Further movement to the right places the leading edges of the shoe blades underneath the folded edge of the wrinkled wrapper so that it can be released by the wrinkle-fingers. Rollers 185 contact track 181 and lift the fingers free of the top layer of the uppermost wrapper and high enough to pass over the upturned lip 77 of the stack depresser plate 74. Shortly after the fingers lift up, rollers 179 also ride under track 181 and lift the pick-up shoe blades off the second wrapper in the stack so as to not tear same as the shoes continue their extension stroke and proceed to curl the lifted wrapper up and to the right where the folded edge 165 passes through gap 186 left between the sections of the roller conveyor. The final position of the pick-up shoes and wrinkle-fingers is that shown in FIGURE 16 where they are fully-extended and the folded edge of the wrapper is sticking up above the surface of the roller conveyor in position to be picked up by an incoming package 188.

As the package 188 moves across the lead-in section 189 of the roller conveyor and crosses gap 186 between said lead-in section and the discharge section 190, it will press the projecting wrapper flap agains the first roller of the discharge conveyor section and pull the entire wrapper off the stack. The wrapper will, of course, end up underneath the package as seen in FIGURE 16. As will be explained presently, the mechanism previously described will immediately actuate to pick-up another wrapper as soon as one has been removed thus having a wrapper ready at all times.

There is always a remote possibility that the mechanism will fail for some reason to pick up a wrapper. Preferably, the machine should recognize this condition and make another attempt to pick one up and have it ready by the time the next package arrives. Accordingly, a wrapper pick-up sensing mechanism broadly designated by numeral 191 has been provided. It comprises a pair of laterally-spaced tubular mounts 192 secured to the right side of the base in position to project out over the magazine 20 in the path of the pick-up shoes 40. In the end of each of these tubular amounts 192 is placed contact 193 having a roller-type feeler 194 on the left end thereof. As will be explained in detail presently, if either or both of these feelers 194 contact the bare metal of the shoe blades 167 indicating the absence of a wrapper, the pick-up cycle will be automatically repeated. On the other hand, if a wrapper prevents metal-to-metal contact between the shoes and feelers, the mechanism will shut off and await the arrival of another package.

Of the mechanical elements of the system, there yet remains to be described the roller conveyor mechanism 23 that can best be seen in FIGURES 3 and 5. It comprises nothing more than a plurality of elongate rollers 24 journalled for rotation between the downturned flanges 195 of angle-iron roller frame elements 196. The horizontal flanges 197 of these angle irons 196 support cover plates 198 that overhand the roller ends.

The roller conveyor assembly is made in two sections, a lead-in section 189 that is hingedly attached to the base by means of hinge brackets 199 shown most clearly in FIGURE 2 and a discharge section 190 located to the right of the lead-in section so as to define gap 186 therebetween. All of the rollers in both sections ride atop V-belts 22 and are rotated thereby in the conventional manner. By hingedly-attaching the lead-in section to the base it, of course, becomes possible to raise it up exposing the operative parts therebeneath.

Figure 19:
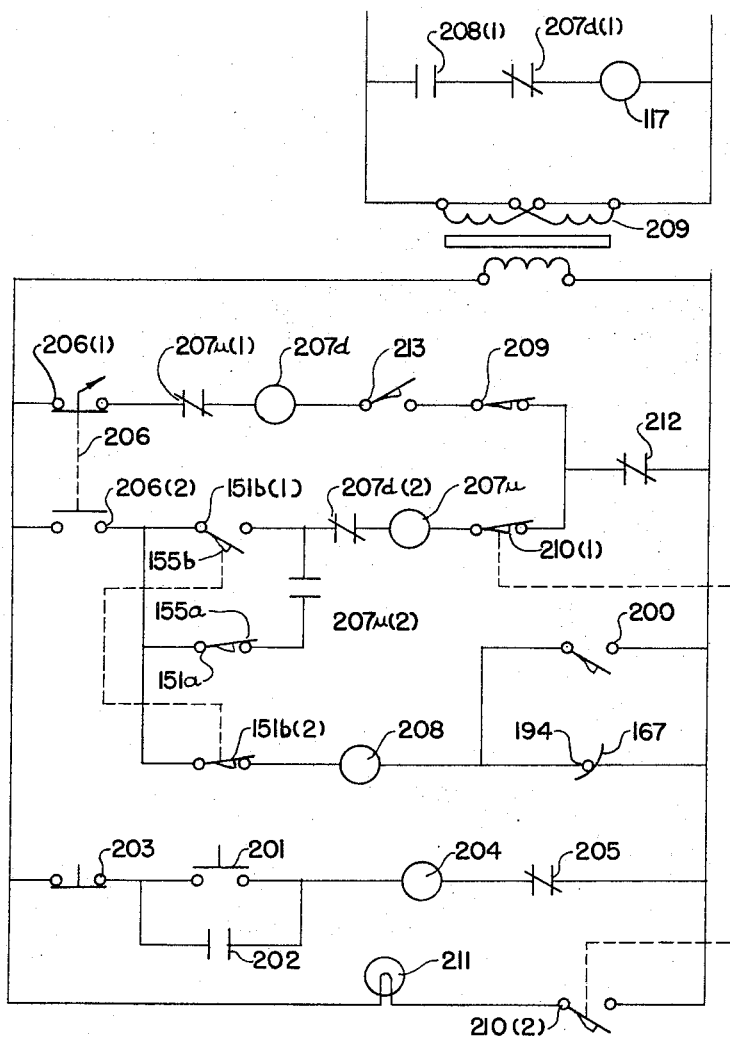
FIGURE 19 is a schematic diagram illustrating the control circuitry.

The portion of the unit that still remains to be described is the control circuitry illustrated in FIGURE 19 to which reference will now be made.

Automatic feeding of the wrappers is controlled and initiated by stack-sensing switch 200 positioned on the roller conveyor in the path of a package just crossing the gap between the conveyor sections. To start up the unit, starting switch 201 is closed momentarily to energize normally-open relay 202 that shunts across said starting switch and completes a low-voltage circuit through normally-closed stopping switch 203 to the starter coil 204 of prime drive motor 93. A normally-closed overload relay 205 has also been included in the circuit. Motor 93 is connected by standard wiring techniques to a three-phase 220 v. or 440 v. power supply, not shown.

Initially, stack-sensing switch 200 will be open because no package has been fed to the wrapper until that will actuate same. Pick-up shoes 40 will be fully-extended such that the metal blades 167 thereof engage roller contacts 194 and complete a low-voltage path around the stack-sensing switch 200.

We will assume the three-position magazine elevator control switch 206 is in its neutral or "OFF" position where its contacts 206(1) and 206(2) are both open. Assume also that the magazine needs more wrappers before the unit can be placed on "automatic" operation.

To fill the magazine, switch 206 is moved to its "DOWN" position closing contacts 206(1) thereof to the starter coil (207)d of reversible gear motor 70. When coil 207d is energized, the motor 70 controlled thereby is started in a direction to lower the wrapper magazine elevator provided normally-open switch 213 is closed. Switch 213 is a limit switch positioned to close when the reciprocating pick-up shoes are fully-extended and held up by the overhanging track so that they cannot swing down as the elevator drops the wrapper stack away therefrom. If this were not so and the elevator could be lowered while the shoes were retracted and supported only by the stack, the shoes would swing down under their shaft when the wrapper stack was dropped where they could be damaged as the elevator is raised back up. It is also necessary to prevent initiation of a wrapper pick-up cycle when the magazine elevator is down. Therefore, energization of 207d opens normally-closed contacts 207d(1) in the high-voltage circuit to retractable stop solenoid 117 thus preventing clutch 110 from becoming engaged until the elevator is up where it needs to be to place a wrapper in position to be picked up. Normally-closed contacts 207*d*(2) of coil 207*u* also open upon energization of motor 93 in a direction to lower the elevator thus opening the circuit to coil 207*u* and preventing said motor from being energized in two directions simultaneously.

When the elevator is all the way down, it opens normally-closed limit switch 209 positioned in the path thereof stopping motor 70. Then the magazine is filled with a stack of wrappers and three-positioned switch 206 is shifted into its "UP" position which opens contacts 206(1) and closes its contacts 206(2). When the wrapper stack dropped away from under switch arm 153 of the stack-height control system 141, arm 154 thereof swung over against actuator 155*b* of switch 151*b* causing normally-open contacts 151*b*(1) of the latter to close. With 151*b* closed as well as contacts 206(2) of switch 206, a low-voltage circuit is completed to coil 207*u* through the normally-closed contacts 207*d*(2) of coil 207*d* that dropped out of the "DOWN" circuit as soon as contacts 206(1) opened. When "UP" coil 207*u* is energized, the reversible gear motor 70 is started in a direction to lift the elevator allowing limit switch 209 to return to its normally-closed position. Normally-closed contacts 207*u*(1) opens in the "DOWN" circuit preventing energization of coil 207*u*. Contacts 207*u*(2) also close shunting across contacts 151*b*(1) through normally-closed switch 151*a*.

When coil 207*d* was de-energized, normally-closed contacts 207*d*(1) thereof returned to closed position and it would be possible to energize control relay 208 to energize retractable stop solenoid 117 through its normally-open contacts 208(1) if it were not for the fact that switch 151*b* includes a pair of normally-closed contacts 151*b*(2) in the low-voltage circuit to the relay 208 that opened as soon as 151*b*(1) closed. Thus, the pick-up cycle is still delayed until the stack of wrappers reaches its proper position for a pick-up.

Now, as the elevator raises the stack, the top of the stack will soon engage arm 153 lifting it up and allowing contacts 151*b*(1) to return to open position while contacts 151*b*(2) reclose placing relay 208 in readiness to be actuated. At this instant, however, arm 153 has not lifted far enough to engage and open switch 151*a* so the motor 70 continues to run. When contacts 151*b*(2) close, relay 208 will immediately energize if blades 167 are making metal-to-metal contact with the roller contact 194, thus actuating solenoid 117 of the high-voltage circuit through normally-open contacts 208(1) and normally-closed contacts 207*d*(1). Once solenoid 117 is actuated, it retracts stop 114 and permits the clutch 110 to engage starting the pick-up cycle.

At this point motor 70 is still raising the elevator but the stack carried thereby will trip arm 153 and open switch 151*a* before the pick-up shoes and wrinkle-fingers retract and start to pick up a wrapper. When 151*a* opens, 207*u* will drop out of the circuit along with its normally open contacts 207*u*(2) that kept motor 70 running after 151*b*(1) opened. The instant coil 207*u* is deenergized, the motor 70 will stop. The shoes and wrinkle fingers will cooperate to pick up the top wrapper from the stack and, as the blades return to their fully-extended position they will leave the circuit to relay 208 open because the wrapper will insulate them from roller contacts 194. Motor 204 is still operating the conveyor and the latter will sooner or later pass a package across gap 186 where it will remove the wrapper and trip switch 200 again closing the circuit to relay 208 so as to actuate solenoid 117. If, perchance, the mechanism has failed to pick-up a wrapper, blades 167 will again engage contacts 194 and recycle the unit immediately upon completion of the first cycle and continuously thereafter until the unit finally succeeds in getting one. Otherwise, the unit will not recycle until switch 200 is tripped signifying that a bundle has moved across the conveyor and picked up the waiting wrapper.

There remain but a few incidental features of the circuit requiring detailed description. The low voltage circuits containing the various elements described above is primarily necessary because of the hazard to personnel occasioned by the bare pick-up blades 167 and roller contacts 194. Transformer 209 accomplishes the transition from normal line voltage supplied to the solenoid circuit down to the 24 volts used in the low-voltage circuits.

It is inadvisable to wait until the magazine is empty before refilling same. Of course, the level of the wrapper stack is being maintained substantially constant by switches 151*a* and 151*b*, the latter actuating to energize motor 70 and raise the stack level as soon as it falls below a predetermined minimum established by the setting given to stack-height level control mechanism 141. In order to warm of a nearly-exhausted stack, a low-level switch 210 having normally-closed contacts 210(1) wired in the low-voltage circuit containing "UP" coil 207*u* is positioned to be actuated by the elevator when its reaches a pre-determined height that shows the stack is becoming short on wrappers. As the elevator contacts this switch and opens its normally-closed contacts 210(1), the "up-elevator" circuit is opened regardless of which of the switches 151*a* or 151*b* is closed so that motor 70 cannot function. At the same time, normally-open contacts 210(2) of switch 210 close completing a circuit to warning signal 211. Even though motor 70 is de-energized, the unit can continue to cycle and pick-up additional wrappers until the stack level falls down so low that switch 151*b* closes de-energizing relay 208 that operates the clutch solenoid 117. If the wrapper stack has not been replenished by this time, the wrapper pick-up cycle will cease until the magazine is refilled.

The only other element shown is overload element 212 connected into the circuit controlling elevator motor 70. Its function, of course, is the same as that of element 205, namely, to shut down the motors in the event of an overload condition.

Having thus described the several useful and novel features of the method and apparatus for placing a folded wrapper under a package, it will be seen that the many worthwhile objectives for which they were devised have been achieved. While only one specific embodiment of the invention has been specifically set forth herein, we realize that certain changes and modifications therein may well occur to those skilled in the art within the broad teaching hereof; hence, it is our intention that the scope of protection afforded hereby shall be limited only insofar as said limitations are expressly set forth in the appended claims.

What is claimed is:

1. A device for separating wrapping sheets folded to provide a pair of overlapping flaps joined together along a common edge from a stack thereof and placing same beneath goods to be packaged which comprises: a wrapper stack magazine including an upright abutment positioned to abut the free edges lying opposite the flap-joining folds of a wrapper stack placed thereagainst; fold-elevating means positioned above the wrapper stack and mounted for reciprocating motion relative thereto in a direction normal to the flap-joining folded edges thereof, said means including at least one friction member operative upon actuation to engage the top fold of the uppermost wrapper and slide same across the bottom flap thereof toward their free edges while said bottom flap remains abutted against the magazine abutment so as to pull the flap-joining folded edge up off the remainder of the stack; roller-conveyor means positioned above the fold-elevating means and operative upon actuation to move goods to be packaged across the top of the magazine toward the upright abutment thereof, said means including a transverse slot positioned in spaced parallel relation above the uplifted flap-joining folded edge of the uppermost wrapper sized and adapted to pass same therethrough; and, wrapper-curling means positioned to one side of the wrapper stack adjacent the flap-joining folded edges thereof, said means including a scoop-shaped blade mounted for reciprocating movement in the same direction as the flap-elevating means, and said blade being operative upon actuation after the flap-joining folded edge of the uppermost wrapper has been lifted by the fold-elevating means to move therebeneath and cause said uppermost wrapper to curl up through the slot in the conveyor means where incoming goods will engage same and pull it off the stack into position underneath said goods.

2. The device as set forth in claim 1 in which: the wrapper stack magazine has a stack-supporting platform in the bottom thereof mounted for vertical movement, a motor operatively connected to the stack-supporting platform adapted upon actuation to raise and lower same, and stack-height-sensing means operatively connected to the motor and adapted to actuate same in a direction to raise the wrapper stack whenever the top thereof falls below a pre-determined level, said stack-height sensing means including normally-open switch means connected to the motor and operative when closed to energize same in a direction to elevate the stack-supporting platform, normally-closed switch means connected to the motor and operative when opened to de-energize the motor, and switch-actuating means having a portion overlying the wrapper stack responsive to the height thereof and a second portion located between the two switches in position to actuate either of said switches, said switch-actuating means being operative to open the normally-closed switch and stop the motor when the top of the wrapper stack reaches an upper predetermined level, and said switch-actuating means being operative to close the normally-open switch and raise the stack when the top thereof falls below a lower pre-determined level.

3. The device as set forth in claim 1 in which: the friction element of the fold-elevating means comprises a rubber-tipped finger adapted to engage the top flap of the uppermost wrapper and push same against the magazine abutment so as to raise a wrinkle in said top flap intermediate said finger and abutment.

4. The device as set forth in claim 1 which includes: means connected to the fold-elevating means and the wrapper-curling means operative upon actuation to accomplish simultaneous reciprocation thereof, said means including link means connecting the wrapper-curling means and fold-elevating means together for simultaneous motion, a rocker arm, having one end connected to the wrapper-curling means adapted when rocked back-and-forth to reciprocate the latter, a crank connected to the other end of the rocker arm, a motor, a clutch operatively interconnecting the motor and crank, and retractable stop means connected to the clutch normally holding same in disengaged condition, said stop means being operative when actuated to release the clutch to engaged position for the period required to complete a single complete cycle of reciprocal motion of the fold-elevating and wrapper-curling means.

5. The device as set forth in claim 1 in which: the friction member is mounted to swing freely up and down about a transverse axis, and the fold-elevating means includes friction member deactivating means operatively associated with the friction member and adapted to raise same free of the top flap of the uppermost wrapper upon movement of the wrapper-curling means into position therebeneath.

6. The device as set forth in claim 1 in which: the blade is mounted to swing freely up and down about a transverse axis, and the wrapper-curling means includes blade-supporting means positioned beneath the blade and operative to support same until it has moved into position beneath the upturned flap-joining fold of the uppermost wrapper whereupon said supporting means releases said blade to drop down upon the next wrapper in the stack thereof.

7. The device as set forth in claim 1 in which: the blade is mounted to swing freely up and down about a transverse axis, and the wrapper-curling means includes blade-lifting means positioned in the path of the blade as the latter moves into the stack, said blade lifting means being operative to engage the blade and lift same free of the stack once said blade has moved into position beneath the upturned flap-joining fold of the uppermost wrapper.

8. The device as set forth in claim 1 in which: the wrapper stack magazine has a stack-supporting platform in the bottom thereof mounted for vertical movement, a reversible motor operatively connected to the stack-supporting platform adapted upon actuation in one direction to lift said platform and in the other direction to lower same, and switch means connected to the reversible motor operative to start and stop same in either direction; and in which said device includes magazine interlock means connected to the reversible motor and switch means controlling same when the latter is energized to lower the platform, said interlock means comprising a normally-open switch responsive to movement of the wrapper-curling means into position when the wrapper pick-up cycle has been completed, and said interlock means being operative upon actuation into closed position to permit energization of the reversible motor in a direction to lower the stack supporting platform.

9. The device as set forth in claim 2 in which: the wrapper stack magazine includes limit switch means responsive to elevation of the stack-supporting platform and connected to the platform elevating motor, said switch means being normally-closed and operative when actuated into open position to shut off the platform elevating motor at such time as the height of the platform indicates the number of wrappers remaining in the stack have fallen to a level where the stack should be replenished.

10. The device as set forth in claim 4 which includes: cycle-triggering means located on the conveyor means in the path of goods crossing the slot therein, said triggering means being operatively connected to the retractable stop means and responsive to movement of goods across the slot to actuate said stop means so as to release the clutch to engaged condition.

11. The device as set forth in claim 4 which includes: recycling means electrically connected to the retractable stop means and adapted upon actuation to energize same so as to release the clutch means to engaged condition, said recycling means comprising an electrical contact located in the path of the wrapper-curling blade adapted upon being engaged thereby to complete the electrical circuit to the retractable stop means whenever said blade completes its cycle of operation without picking up a wrapper, said wrapper normally insulating said contact from said blade to prevent recycling.

12. The device as set forth in claim 4 in which: the wrapper-curling means includes a transversely-extending rail-mounted rotatable shaft carrying the blade; the fold-elevating means includes a second transversely-extending rail-mounted rotatable shaft carrying the friction member; the link means interconnects said shafts for reciprocating motion in spaced parallel relation to one another; and, the upper end of the rocker arm is connected to the shaft of the wrapper curling means.

13. The device as set forth in claim 5 in which: the friction member includes an arm adapted to pivot same about its axis, and the friction member deactivating means comprises an overhanging track positioned to engage said arm and lift said friction member free of the stack.

14. The device as set forth in claim 6 in which: the blade has a substantially horizontal supporting surface in the underside thereof, and the blade-supporting means comprises a roller positioned in supporting relation to said supporting surface on the underside of the roller.

15. The device as set forth in claim 7 in which: the blade includes an arm adapted to pivot same about its transverse axis, and the blade-lifting means comprises an overhanging track positioned to engage said arm and lift said blade up underneath the wrapper supported thereon.

16. The device as set forth in claim 11 which includes: cycle-triggering means located on the conveyor means in the path of the goods crossing the slot therein, said triggering means being operatively connected to the retractable stop means and responsive to movement of goods across the slot to actuate said stop means so as to release the clutch to engaged condition, and said cycle-triggering means being connected in parallel relation with the recycling means and in a common electrical circuit so that either of said means remains capable of actuating the retraction means even though the other of said means is unactuated.

17. The method of separating sheet wrappers folded to provide a pair of overlapping flaps joined together along a common edge from a stack thereof and placing same beneath goods to be packaged which comprises the steps of: restraining the free-edges opposite the flap-joining fold of the uppermost wrapper in the stack, sliding the top flap across the bottom flap in the direction of their restrained free edges until said top layer wrinkles and the flap-joining fold raises off the stack, curling the flap-joining fold up and over toward the free edges, supporting the uplifted portion of the wrapper on the inside of the curl, and passing the goods to be packaged across the supported portion in a direction to roll the wrapper off the top of the stack and leave same under the goods.

References Cited

UNITED STATES PATENTS

| | | | |
|---|---|---|---|
| 1,426,429 | 8/1922 | Weightman et al. | 53—209 X |
| 2,569,692 | 10/1951 | Rockwell | 271—16 X |
| 3,250,053 | 5/1966 | Hyer et al. | 53—389 X |

TRAVIS S. McGEHEE, *Primary Examiner.*

L. S. BOUCHARD, *Assistant Examiner.*